United States Patent
Ashikhmin et al.

(10) Patent No.: US 7,809,070 B2
(45) Date of Patent: Oct. 5, 2010

(54) CROSSTALK ESTIMATION METHODS AND APPARATUS USING AUXILIARY TIME-DOMAIN SIGNALS

(75) Inventors: Alexei Ashikhmin, Morristown, NJ (US); Philip Alfred Whiting, New Providence, NJ (US); Adriaan J. De Lind Van Wijngaarden, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 763 days.

(21) Appl. No.: 11/753,332

(22) Filed: May 24, 2007

(65) Prior Publication Data

US 2008/0291989 A1  Nov. 27, 2008

(51) Int. Cl.
H04L 27/28 (2006.01)
(52) U.S. Cl. ..................................... 375/260
(58) Field of Classification Search ................. 375/142, 375/143, 150, 152, 343, 219, 224, 260; 704/216, 704/218, 237, 263; 708/5, 442, 813; 342/108, 342/145, 189, 378; 370/201
See application file for complete search history.

(56) References Cited

U.S. PATENT DOCUMENTS

| | | | |
|---|---|---|---|
| 6,693,992 B2 | 2/2004 | Jones et al. | |
| 6,829,293 B2 | 12/2004 | Jones et al. | |
| 6,885,746 B2 * | 4/2005 | Hausman et al. | ............ 379/417 |
| 6,937,613 B1 | 8/2005 | Bedrosian | |
| 6,975,677 B2 * | 12/2005 | Matsumoto | .................. 375/232 |
| 6,985,521 B1 | 1/2006 | Rezvani et al. | |
| 7,027,490 B2 * | 4/2006 | Yellin | ......................... 375/148 |
| 7,050,388 B2 * | 5/2006 | Kim et al. | .................. 370/201 |
| 7,463,733 B2 * | 12/2008 | Watkinson | ................... 379/416 |
| 2005/0195892 A1 * | 9/2005 | Ginis et al. | .................. 375/222 |
| 2006/0029148 A1 * | 2/2006 | Tsatsanis | ..................... 375/267 |

OTHER PUBLICATIONS

X. Hou et al., "A Time-Domain Approach for Channel Estimation in MIMO-OFDM-Based Wireless Networks," IEICE Trans. Commun., Jan. 2005, pp. 3-9, vol. E88-B, No. 1.
P.V. Kumar et al., "Large Families of Quaternary Sequences with Low Correlation," Proceedings, 1994 IEEE International Symposium on Information Theory, 1994, p. 71.
F. Jessie MacWilliams et al., "Pseudo-Random Sequences and Arrays," Proceedings of the IEEE, Dec. 1976, pp. 1715-1729, vol. 64, No. 12.

* cited by examiner

Primary Examiner—Sam K Ahn
(74) Attorney, Agent, or Firm—Ryan, Mason & Lewis, LLP

(57) ABSTRACT

Techniques are disclosed for measuring crosstalk between at least two communication channels of a communication system. A receiver of the system receives a signal over a given one of the communication channels from a transmitter of the system. The receiver correlates the received signal with a sequence of time-domain signals associated with another of the communication channels, and generates a measure of crosstalk between the given communication channel and the other communication channel based on the correlation between the received signal and the sequence of time-domain signals. The sequence of time-domain signals may be selected from a designated set of M-sequences.

20 Claims, 4 Drawing Sheets

400

500

CROSSTALK ESTIMATION METHODS AND APPARATUS USING AUXILIARY TIME-DOMAIN SIGNALS

FIELD OF THE INVENTION

The present invention relates generally to communication systems, and more particularly to techniques for estimating crosstalk between communication channels in such systems.

BACKGROUND OF THE INVENTION

As is well known, a communication system may utilize multiple communication channels to communicate signals between transmitters and receivers of the system. For example, multiple channels may be used to separate different transmitted data signals from one another, or to provide an increased data rate.

A problem that can arise in multiple channel communication systems relates to crosstalk between the various channels, also referred to as inter-channel crosstalk. For example, in a typical digital subscriber line (DSL) system, each of the channels may comprise orthogonal frequency division multiplexed (OFDM) tones transmitted over a physical communication link such as twisted-pair copper wire. A transmission on one subscriber line may be detected on other subscriber lines, leading to interference that can degrade the throughput performance of the system. More generally, a given "victim" channel may experience crosstalk from multiple "disturber" channels, again leading to undesirable interference.

Techniques for compensating for inter-channel crosstalk in a communication system are described in U.S. patent application Ser. No. 60/922,703, filed Apr. 9, 2007 and entitled "Determining a Channel Matrix by Measuring Interference," which is commonly assigned herewith and incorporated by reference herein. In one approach disclosed in the above-cited patent application, off-diagonal elements of a channel matrix are estimated using signal-to-interference-plus-noise ratios (SINRs) measured by a receiver and communicated from the receiver back to the transmitter. The resulting channel matrix may be used to compensate for the inter-channel crosstalk.

Despite the considerable advantages provided by the exemplary techniques described in the above-cited patent application, a need remains for further improvements, particularly in terms of estimating channel crosstalk in DSL systems and other communication systems that may include unsynchronized channels.

SUMMARY OF THE INVENTION

The present invention in one or more illustrative embodiments provides techniques for generating measures of crosstalk using sequences of auxiliary time-domain signals that may be transmitted in combination with data signals over respective channels of a communication system.

In one aspect of the invention, a receiver of the system receives a signal over a given one of the communication channels from a transmitter of the system. The receiver correlates the received signal with a sequence of time-domain signals associated with another of the communication channels, and generates a measure of crosstalk between the given communication channel and the other communication channel based on the correlation between the received signal and the sequence of time-domain signals. The sequence of time-domain signals may be selected from a designated set of M-sequences.

In an illustrative embodiment, the sequence of time-domain signals is selected from a designated set of M-sequences. The designated set of M-sequences may comprise, by way of example, an unbiased set $$M=\{m_0, m_1, \ldots, m_{N-1}\}$$

having $N=2^M-1$ elements, wherein distinct elements of M satisfy the property $$|(m_j^{[s1]})^\dagger m_k^{[s2]}|=2^{M/2}-1$$

when $j \neq k$ and for arbitrary cyclic shifts $s_1, s_2$.

In another aspect of the invention, the communication channels for which crosstalk measures are to be generated are separated into a plurality of synchronization groups, with each of the synchronization groups being associated with a distinct element of a designated set of sequences of time-domain signals. Within a given one of the synchronization groups associated with a particular distinct element of the designated set of sequences, the time-domain signals corresponding to the respective channels of that group are selected as respective cyclic shifts of the distinct element.

The disclosed techniques can be implemented in a wide variety of wired or wireless communication systems, including DSL systems and cellular systems.

Advantageously, the illustrative embodiments allow crosstalk measurements to be made for channels that are not synchronized with one another at either a symbol level or a sample level. Accurate crosstalk estimates can thus be obtained in an efficient manner, thereby facilitating operations such as precoding and line stabilization in a communication system transmitter.

These and other features and advantages of the present invention will become more apparent from the accompanying drawings and the following detailed description.

DETAILED DESCRIPTION OF THE INVENTION

The present invention will be illustrated below in conjunction with exemplary communication systems and associated techniques for generating measures of crosstalk between communication channels in such systems. It should be understood, however, that the invention is not limited to use with any particular type of communication system or channel crosstalk measurement application. The disclosed techniques are suitable for use with a wide variety of other communication systems, and in numerous alternative crosstalk measurement applications. For example, although illustrated below in the context of DSL systems based on OFDM, the disclosed techniques can be adapted in a straightforward manner to other types of wired or wireless communication systems, including cellular systems, multiple-input multiple-output (MIMO) systems, Wi-Fi or WiMax systems, etc.

Figure 1:
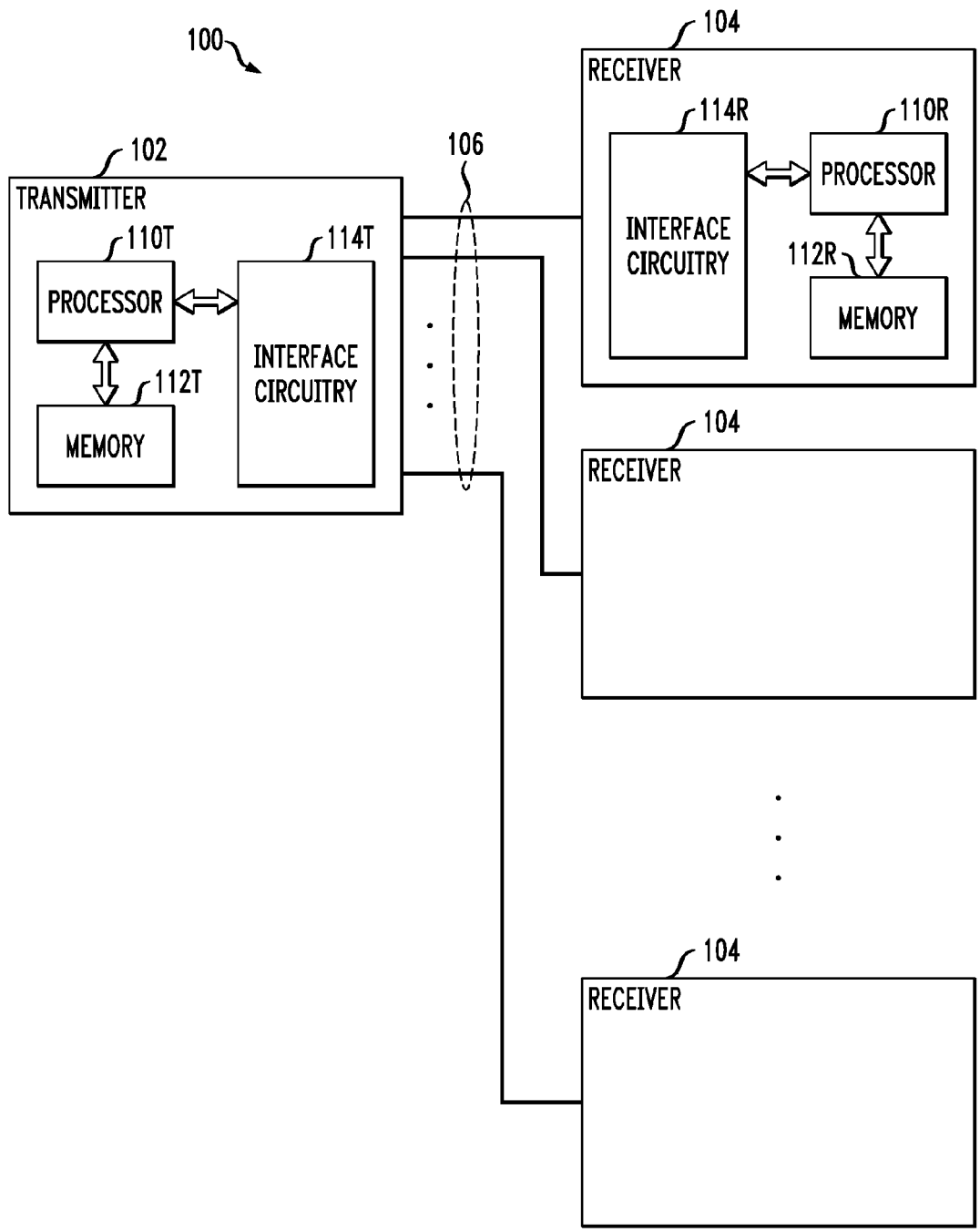
FIG. 1 is a block diagram of a communication system in an illustrative embodiment of the invention.

FIG. 1 shows a communication system 100 comprising a transmitter 102 that communicates with multiple receivers 104 over respective communication channels 106. The communication channels 106 may comprise wired channels or wireless channels. As shown in FIG. 1, the transmitter 102 comprises a processor 110T coupled to a memory 112T and interface circuitry 114T. Similarly, a given one of the receivers 104 comprises a processor 110R coupled to a memory 112R and interface circuitry 114R. The other receivers 104 are assumed to be configured in a similar manner.

Although a single transmitter is shown communicating with multiple receivers in the illustrative system 100, numerous other configurations are possible. For example, multiple transmitters may communicate with multiple receivers, or a single transmitter may communicate with a single receiver. The terms "transmitter" and "receiver" as used herein are intended to be construed generally, so as to encompass single respective transmitter and receiver elements as well as combinations of multiple respective transmitter and receiver elements. Also, the transmitter 102 may comprise multiple separate transmitters, for example, in the case of a central office in a DSL system, or a base station in a cellular system.

Moreover, a given communication device of the type shown in the figure may function as both a receiver and a transmitter. Thus, elements 102 and 104 of system 100, although characterized as respective transmitter and receiver elements for purposes of illustration, may each comprise transceiver circuitry and be operative to function as both a transmitter and a receiver. The crosstalk measurement techniques disclosed herein may therefore be applied to transmissions from an element 104 to the element 102. Elements 102 and 104 may comprise or be incorporated into respective processing devices of a communication system, such as modems, computers or other communication devices. Numerous such devices are well known to those skilled in the art and are therefore not further described herein.

Software programs for generation of crosstalk measures and performance of associated transmitter and receiver signal processing operations in the system 100 may be stored in the memories 112 and executed by the processors 110. The transmitter 102 and receivers 104 may each comprise multiple integrated circuits, digital signal processors or other types of processing devices, and associated supporting circuitry, in any combination, using well-known conventional arrangements. Of course, numerous alternative arrangements of hardware, software or firmware in any combination may be utilized in implementing the transmitter 102 and receivers 104 or particular portions thereof.

The system 100 as shown in the figure may be viewed as being representative of any of a number of different types of communication systems. By way of example, the system 100 may comprise a DSL system in which data is transmitted using OFDM tones. Conventional aspects of such systems are well known and therefore not described in detail herein. Inter-channel crosstalk in a DSL system using OFDM may comprise, for example, far-end crosstalk (FEXT), although the disclosed techniques are more generally applicable to a wide variety of other types of crosstalk. Because the OFDM tones are typically relatively narrow with respect to the total frequency spectrum used, the impact at a particular frequency may be modeled as a single complex coefficient h denoting the crosstalk into a given "victim" subscriber line from a given "disturber" subscriber line at a given tone index. The amplitude of the coefficient represents the change in scale for the corresponding OFDM carrier whereas the phase of the coefficient represents the change in phase for that carrier.

The crosstalk between the multiple communication channels 106 over which transmitter 102 communicates with receivers 104 in the system 100 may be compensated using an approach referred to as precoding, also known as precompensation. In this approach, crosstalk measures determined by the receivers and communicated to the transmitter are used to determine coefficients of a channel matrix. Effective precoding generally requires both channel gain and phase information. For example, using a linear crosstalk model to characterize N channels, an N×N channel matrix may be generated, with the off-diagonal elements of the matrix representing the above-noted complex coefficients characterizing the inter-channel crosstalk. The precoding may be applied in the transmitter using a linear zero-forcing digital filter that receives as its inputs a vector of data signals to be transmitted and the above-noted channel matrix and generates therefrom a vector of compensated data signals.

Another application in which measures of inter-channel crosstalk may be used is in managing the various channels of the system. For example, such measures may be used to determine an optimum allocation of power or other resources among the channels or to provide stability of channel bit rates. In the DSL context, this may involve utilizing the measures to improve dynamic spectrum management (DSM) level 2 power assignments or stability algorithms, thereby facilitating the maintenance of a declared bit rate for a given line. These and other resource allocation applications typically require less accurate estimates, and hence may not need channel phase information.

The transmitter 102 and receivers 104 of system 100 in FIG. 1 are advantageously configured such that estimates or other measures of inter-channel crosstalk may be generated in an accurate and efficient manner. Such measures may be returned from the receivers 104 to the transmitter 102 for use in applications such as precoding or resource allocation of the type described above. The measures may comprise, for example, impulse response coefficients characterizing the crosstalk. Alternatively, measures generated by the receivers may be returned to the transmitter and further processed there to obtain impulse response coefficients.

Figure 2:
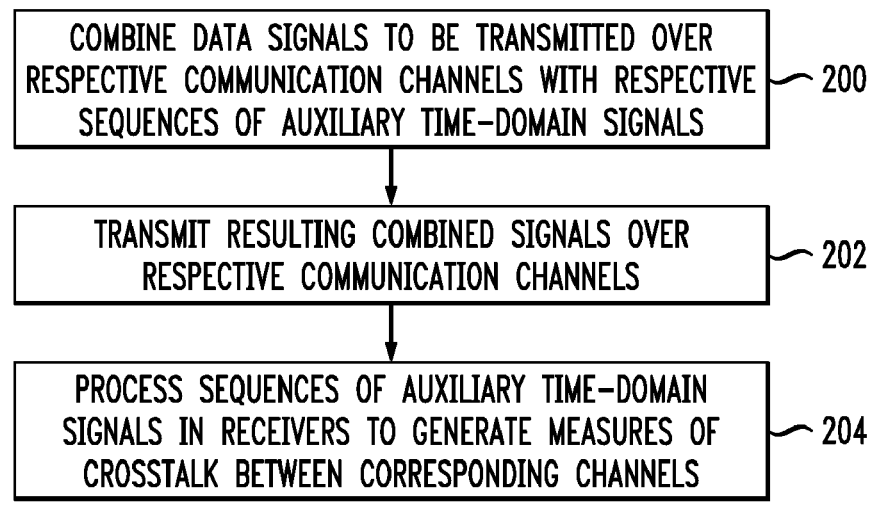
FIG. 2 is a flow diagram of a crosstalk measurement process implemented in the FIG. 1 communication system.

Referring now to FIG. 2, an illustrative embodiment of a process for estimating crosstalk in the system 100 of FIG. 1 is shown. Steps 200 and 202 are performed in transmitter 102, and step 204 is performed in one or more of the receivers 104.

In step 200, data signals to be transmitted over respective ones of the communication channels 106 are combined with respective sequences of auxiliary time-domain signals. As will be described in greater detail below, more particular examples of such sequences of auxiliary time-domain signals are M-sequences, although other types of sequences may be used. Conventional aspects of M-sequences are described in, for example, P. V. Kumar et al., "Large Families of Quaternary Sequences with Low Correlation," Proceedings, 1994 IEEE International Symposium on Information Theory, p. 71, 1994; and N. Sloane and F. MacWilliams, "Pseudo-Random Sequences and Arrays," Proceedings of the IEEE, Vol. 64, No. 12, pp. 1715-1729, 1976. Additional details will be provided below regarding the particular M-sequences used in illustrative embodiments.

The time-domain signals in the illustrative embodiments are referred to as "auxiliary" in that such signals are transmitted in addition to and in combination with data signals that are otherwise transmitted in conventional operation of the system.

In step 202, the resulting combined signals are transmitted over the respective communication channels of the system.

In step 204, the received sequences of auxiliary time-domain signals are processed in the receivers to generate one or more measures of crosstalk between corresponding channels. For example, as indicated above, measures sufficient to determine the off-diagonal elements of a channel matrix may be generated. The auxiliary time-domain signals may also be used to make direct channel measurements suitable for determining the diagonal elements of the channel matrix.

The processing referred to in step 204 will generally involve at least one of the receivers correlating a received signal with at least one sequence of time-domain signals associated with another of the communication channels. That receiver will then generate a measure of crosstalk between its communication channel and the other communication channel based on the correlation between the received signal and the sequence of time-domain signals associated with the other communication channel. It should be noted that the sequence of time-domain signals used in the correlation may be generated by the receiver. For example, it may be generated by the receiver as needed, or stored by the receiver in memory and retrieved for use as needed. The correlation process can be repeated at each of the receivers, and for each of the desired crosstalk measures to be generated.

The received signal referred to above may itself comprise a sequence of time-domain signals associated with the corresponding channel. Alternatively, the sequence of time-domain signals may be removed by cancellation or other technique prior to correlation of that received signal with the sequence of time-domain signals associated with the other communication channel.

An exemplary implementation of the above-described process in the context of DSL will now be described in greater detail. The transmitter for a given subscriber line transmits an additional sequence of time-domain signals, for example, an M-sequence. The M-sequence is combined in the time domain with the OFDM data symbols being transmitted as part of standard DSL operation. For example, a given M-sequence may be generated using a feedback shift register or other type of sequence generator, and then added directly to digital samples of the OFDM symbols. Such digital addition may occur on a sample-by-sample basis. Numerous other techniques may be used to combine M-sequences with corresponding data signals, as will be appreciated by those skilled in the art.

The M-sequences in this embodiment are taken from a set of M-sequences that we refer to herein as an unbiased set. The elements of such a set are also referred to herein as unbiased sequences. The notion of an unbiased set of M-sequences is not part of the conventional aspects of M-sequences described in the above-cited references.

A group of subscriber lines transmitting in synchronization with one another is referred to herein as a synchronization group. Within such a group the subscriber lines will all use sequences based on a common M-sequence. More specifically, a given synchronization group will use a distinct element of an unbiased set, and individual subscriber lines within the given group will use cyclic shifts of the element chosen for that group. As will be described in greater detail below, such an approach is advantageous in that once synchronization is established between one line in the group and another line in the group, then synchronization is established between all lines in the group.

The M-sequences will now be described in greater detail. A given M-sequence is denoted herein as $m_k$ and comprises a sequence of $2^M-1$ elements $m_{k,j} \in \{-1, 1, i, -i\}$, $0 \leq j \leq N-1$. Hence the entire M-sequence vector (length $N=2^M-1$) is $$m_k = (m_{k,0}, m_{k,1}, \ldots, m_{k,N-1}).$$

These sequences are complex, that is, have real and imaginary parts. An s-shift of the sequence $m_k$ is denoted as $m_k^{[s]}$ and is the M-sequence with values $$m_k^{[s]} = (m_{k,0}^{[s]} = m_{k,s}, m_{k,1}^{[s]} = m_{k,s+1}, \ldots, m_{k,N-1}^{[s]} = m_{k,s-1}).$$

It is thus an s cyclic shift of the original M-sequence $m_k$. The autocorrelation properties of M-sequences are well known, as is the fact that such sequences can be readily generated using a shift register with feedback.

Assume we form the usual Hermitian product between real vectors of length N as the sum of componentwise products $$a^\dagger b = \sum_k a_k^* b_k.$$

Then it is well known that for a given shift s, $$\left(m_k^{[s_1]}\right)^\dagger m_k^{[s_2]} = \begin{cases} 2^M - 1 & \text{if } s_1 = s_2 \\ -1 & \text{otherwise} \end{cases}.$$

As indicated previously, we have determined that certain sets of M-sequences are particularly useful in the illustrative embodiments. For example, the above-noted unbiased set may be denoted herein as $$M = \{m_0, m_1, \ldots, m_{N-1}\} \quad (1)$$

and is distinguished by the following property between distinct elements of M $$|(m_j^{[s_1]})^\dagger m_k^{[s_2]}| = 2^{M/2} - 1$$

when $j \neq k$ and for arbitrary cyclic shifts $s_1, s_2$. The value of the correlation may be written $$(m_j^{[s_1]})^\dagger m_k^{[s_2]} = (2^{M/2} - 1)\phi_{jk}^{[s_2-s_1]}$$

where $\phi_{jk}^{[s_2-s_1]}$ is a unit complex scalar. Moreover, the above property continues to hold if we take any arbitrary pair of cyclic shifts of two distinct elements of M. An unbiased set may have as many as $N = 2^M - 1$ members.

To reiterate, each individual synchronization group in the present embodiment will use a distinct element of the unbiased set M. Individual subscriber lines within a given group will use respective cyclic shifts of the element of M chosen for their group.

The correlation properties of M-sequences can be illustrated with the following simplified example. In this example, a set of M-sequences is assumed to be given by a set of $N = 2^M - 1$ binary vectors $v_j$, $j = 0, \ldots, N-1$, with entries 1,-1 of the form $$v_0 = (m_1, m_2, \ldots, m_N)$$

$$v_1 = (m_2, m_3, \ldots, m_1)$$

$$\ldots$$

$$v_{N-1} = (m_N, m_1, \ldots, m_{N-1})$$

It can be seen that all of these sequences are obtained as cyclic shifts of $v_0$. We will denote $v_0$ by $m^{[0]}$ and $v_1$ by $m^{[t]}$, where the upper index t denotes the cyclic shift by t elements. This set of M-sequences has the property:

$$m^{[i]} \cdot m^{[j]} = \begin{cases} N, & i = j \\ -1, & i \neq j, \end{cases}$$

where "·" denotes the scalar product of two vectors. This exemplary set of M-sequences can be used to obtain synchronization without a timing reference in the following manner. Let us assume that N=7 and that we repeatedly transmit the sequence $m^{[1]}$ on a DSL line. Then the transmitted vector a is $$a=(m_2,m_3,m_4,m_5,m_6,m_7,m_1,m_2,m_3,m_4,m_5,m_6,m_7, m_1,\ldots).$$

If now we compute a sliding window correlation vector u of the vector a with $m^{[1]}$ as $$u_t=v_t v_1^{[1]}+v_{t+1}v_2^{[1]}+\ldots+v_{t+N-1}v_N^{[1]}$$

then the result as we slide $m^{[1]}$ along a will be:

$$u=(N,-1,-1,-1,-1,-1,-1,N,-1,-1,-1,-1,-1,-1,\ldots).$$

This allows us to identify synchronization between $m^{[1]}$ and a as a pronounced peak. This ability to establish synchronization also assists us in identifying the line for which we estimate crosstalk. That is, the identification allows us to determine the particular line to which a given measurement corresponds. The M-sequences disclosed herein are particularly well suited to this purpose, although as indicated previously other types of sequences can be used. For example, random or pseudorandom sequences may be used. These and other sequences described herein can be generated, for example, in an online mode when transmitting and receiving, or in an offline mode and stored for subsequent use.

It should be noted that the above correlation example uses real rather than complex M-sequences for simplicity and clarity of illustration. Subsequent description herein should be understood to refer to the notation used previously in introducing the complex M-sequences. Real and imaginary parts of the complex M-sequences may be sent alternately over a subscriber line or other channel, or using other transmission techniques. For example, complex M-sequences can be sent over a real channel by alternating transmission of real and imaginary values of the M-sequences as respective odd and even "chips."

A more detailed example of one possible implementation of the FIG. 2 crosstalk measurement process in the FIG. 1 system will now be described. This example involves measuring the individual crosstalk impulse response from multiple channels crosstalking into a given victim channel, and identifying which channels give rise to which of the respective measured impulses responses.

At the transmitter side, each channel to be measured transmits repeatedly an M-sequence in synchronization with other such channels belonging to the same synchronization group. Each channel within a given synchronization group uses the same M-sequence but with a different shift. The time between shifts is chosen to be longer than the duration of the impulse responses to be measured.

At the receiver side, at least one and possibly several correlators are used to measure the impulse responses. Consider by way of example the measurement of the impulse response of crosstalk from a single disturber channel Y into a victim channel X. The receiver associated with channel X uses in its correlator the M-sequence of the synchronization group of disturber channel Y and measures the output with correlation performed at various lags. Among the various searched lags there will be a small number of consecutive lags where the output is large and stays relatively large. This is the peak of the impulse response of crosstalk from channel Y into channel X. The output of the correlator is a rough estimate of the crosstalk impulse response. The receiver associated with channel X may further process its measurements for channel Y and any other disturber channels to obtain refined estimates for all the desired crosstalk impulse responses. This further processing may be used, for example, to clear up any cross correlation which gets into the correlator outputs as common M-sequences are being simultaneously used within the system. In other embodiments, such further processing may be performed, for example, in a separate device on behalf of multiple receivers, or in the transmitter based on crosstalk measures returned to the transmitter by the receivers.

It is the lag of the M-sequence which distinguishes a particular channel from the other channels in the same synchronization group. Also, because the channels in a given synchronization group are using a common M-sequence, synchronization to one channel of the group provides synchronization to all channels of the group. This simplifies acquisition of the synchronization and association of particular impulse response measurements with particular channels.

Figure 3:
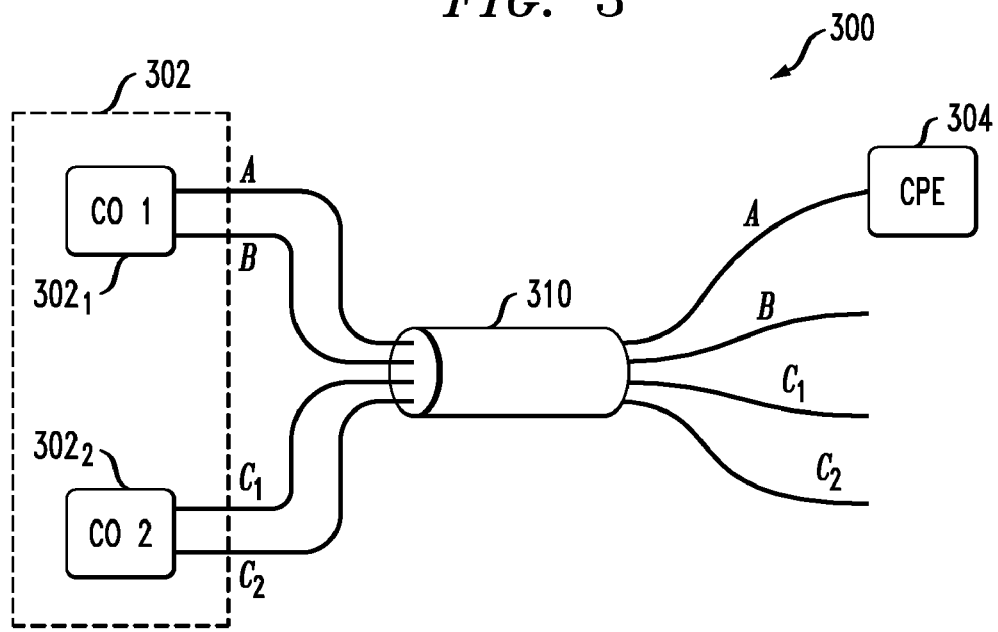
FIGS. 3, 4 and 5 show other exemplary communication systems configured in accordance with the invention.

Referring now to FIG. 3, an illustrative embodiment of a communication system 300 is shown. The system 300 will be used to further illustrate the manner in which M-sequences of the type described above are utilized to generate measures of inter-channel crosstalk. In this embodiment, system 300 comprises a transmitter 302 that is assumed to be associated with a central office of a DSL system. The transmitter 302 comprises a first central office transmitter $302_1$, also denoted CO 1, and a second central office transmitter $302_2$, also denoted CO 2. The transmitter 302 communicates over DSL lines A, B, $C_1$ and $C_2$ as shown. For example, central office transmitter CO 1 transmits over DSL line A to a receiver 304 that in this embodiment is assumed to comprise customer premises equipment (CPE), which may comprise a modem, a computer or other communication device. Although not explicitly shown in the figure, other receivers may be associated with respective ones of the other DSL lines B, $C_1$ and $C_2$.

In this embodiment, each of the DSL lines is considered a separate channel. These direct channels for at least a portion of their length share a common binder 310, which may contribute to inter-channel crosstalk. The binder 310 may represent, for example, a common shielding, enclosure, conduit or other mechanism for binding one or more DSL lines together.

The impulse response of the crosstalk between line A as victim and line B as disturber is denoted herein as $h^{AB}(t)$. For simplicity and clarity of description we assume that it is sufficient to measure a sampled representation of the impulse response which we may write as a vector $$h^{AB}=(h_0^{AB}, h_1^{AB}, \ldots, h_L^{AB})$$

where values beyond L are assumed to be negligible in their contribution to determining the crosstalk. The time spacing for the discrete representation above is assumed to be the interval between individual OFDM samples. The lag L may be determined in advance, thus enabling the determination of reasonable spacing between the shifts for the sequences of a synchronization group.

We will consider the case of two synchronization groups, group A and group C. Group A consists of only two lines, line A and line B. Similarly group C consists of the two lines $C_1$, $C_2$. It should be understood that additional lines and additional groups may be handled in a similar manner.

Once the impulse response components have been estimated it will be necessary to associate them with the correct lines. This is done in the present embodiment as follows. First each group of lines is associated with a unique element of M which thus labels the group. Individual line identities are then determined by their respective shift positions, with the first line of the group having the earliest shift and the last line of the group having the latest shift. We assume that there is sufficient spare time after the final line to be able to observe where the first line begins. The number of lines in each synchronization group would be made available as necessary.

The correlation approach in the present embodiment will now be described. We assume that line A's group uses sequences based on element $m_1$ of M and that lines $C_k$, k=1, 2 use sequences based on element $m_2$ also from M but distinct. We will be interested in determining the crosstalk from disturber lines B, $C_1$ and $C_2$, where the victim line A is a line in the first synchronization group, as already mentioned.

It should be noted that, in correlating a received signal for a given victim channel with the M-sequences of the disturber channels, the sequence of the victim channel may be cancelled or otherwise removed prior to correlation. The term "received signal" as used herein is intended to be construed generally, so as to encompass a victim channel signal subject to correlation with or without cancellation of the sequence of that channel.

In the present embodiment, the correlation algorithm proceeds generally as follows.

1. Use the synchronization of the line A group to directly correlate for line B at all desired lags l, as in equation (2) below.

2. Acquire M-sequences for lines $C_1$, $C_2$.

3. Obtain correlations for lines $C_1$, $C_2$ as in equation (3) below.

4. Solve iteratively the linear equations determining the impulse response at all lags for lines B, $C_1$, $C_2$.

5. Transform the impulse response from the time domain to the frequency domain.

Denote the time-domain signal on line A as y, where we assume, for instance, that the signal transmitted on line A by central office CO 1 has been cancelled using line A's direct channel. This enables the correlation procedure to proceed with much greater accuracy. The time-domain signal y is one example of what is referred to herein as a "received signal" and has the following form $$y = h_0^{AB} m_1^{[s_B]} + \cdots + h_L^{AB} m_1^{[s_B+L]} + h_0^{AC_1} m_2^{[s_{C_1}+r]} + \cdots +$$
$$h_L^{AC_1} m_2^{[s_{C_1}+L+r]} + h_0^{AC_2} m_2^{[s_{C_2}+r]} + \cdots + h_L^{AC_2} m_2^{[s_{C_2}+L+r]} + z$$

where z is the external noise plus interference, and r is the unknown time shift between the synchronization groups A and C. The parameter r may be determined using well-known sequence acquisition techniques. In the present embodiment, the parameter r is learned at step 2 of the above algorithm. The signal y consists primarily of crosstalk from other lines but there is additional external interference and noise. The external interference can include, for example, alien crosstalk from lines which for one reason or another cannot be measured using the techniques described here. Also included is interference from radio transmissions and other sources. Again, this is only an example of one received signal that is subject to correlation in a particular embodiment, and other embodiments may process received signals in a wide variety of other formats.

At step 1 of the above algorithm we correlate the received signal y with the sequences $m_1^{[s_B+l]}$, l=0, ..., L and so obtain, $$\tau_l^{AB} = y^\dagger m_1^{[s_B+l]}. \tag{2}$$

As mentioned before, at step 2 we learn the parameter r. At step 3 we correlate y with $$m_2^{[s_{C_1}+l+r]}$$

and similarly for line $C_2$. As a result we obtain $\tau_l^{AC_k}$, k=1, 2; l=0, ..., L as, $$\tau_l^{AC_k} = y^\dagger m_2^{[s_{C_k}+r+l]}, \quad k = 1, 2 \tag{3}$$

where l=0, ..., L.

Let us examine the correlation coefficients in detail. We will concentrate on line B, with the understanding that the analysis for other lines is similar.

We now obtain the contributions to the above correlations for the B line. First there is the impulse response at lag l, $$2^M h_l^{AB}.$$

This is large because we are at lag l with respect to the original sequence transmitted on line B and we are correlating with $m_2^{[s_B+l]}$.

For the same line B at all other lags l' we obtain a sum of terms $$-\sum_{l' \neq l} h_{l'}^{AB}.$$

Further, more generally, if there was another line B', correlation with the B sequence at lag l would yield additional contributions, of the form $-\Sigma_l h_l^{A,B'}$.

Next we examine the correlation for the lines in the other synchronization group, namely, lines $C_k$, k=1, 2. Denote this quantity as $\omega_l^{BC}$. Using the correlation property between two distinct sequences in the set M plus the definition of the φ scalars made earlier, we obtain $$\omega_l^{BC} = (2^{M/2} - 1) \sum_{k=1,2} \sum_{l'=0}^{L} \phi_{12}^{[s_{C_k}+l'+r-s_B-l]}$$

At this stage we have completed steps 1-3 of the algorithm.

Finally there is the noise term, $\chi_l^{AB} = y^\dagger z$ which we take to be a zero mean finite variance random variable. Thus we have that $$\tau_l^{AB} = 2^M h_l^{AB} - \sum_{l' \neq l} h_{l'}^{AB} + \omega_l^{BC} + \chi_l^{AB}$$

Note that all τ terms are known and our problem is to find the impulse response vectors for the two synchronization groups. Thus at this stage we have determined all the coefficients for all the components of the impulse response for lines B, $C_1$, $C_2$ and so we can move to step 4 of the algorithm.

In finding the impulse response values we had to perform correlation with respect to the C group as with A's group. In so doing we note an advantage of our approach in this embodiment is that once one has synchronized to one line in a synchronization group then one has done so for all lines of that group. Indeed the initial correlation search might be done using several correlators together and searching for a common peak. From that step one may perform the correlations for individual lines within C's group.

Now note that we have a very large coefficient multiplying the impulse response at the correct lag l, $2^M h_l^{AB}$ in the expansion above with all other terms being much smaller. This is also true for correlations with respect to the lines $C_k$, k=1, 2.

To solve we may use the following well-known recursive technique for complex matrices which are diagonally dominant. At the initial step, all the unknowns (including the noise which has to be neglected) are set to 0 except the term with the large coefficient $2^M$. This yields the following as an initial estimate for the impulse response for line B at lag l $$h_l^{AB} \approx 2^{-M} \tau_l^{AB} \qquad (4)$$

Similar initial estimates can be obtained for lines $C_1$, $C_2$ in the same way.

The recursive technique proceeds as follows to obtain a more accurate solution. The initial estimates are substituted into all the terms of the linear equations except the leading ones with the $2^M$ coefficient and we then subtract from τ. Now we obtain new estimates for $h_l^{AB}$ and for the C lines by dividing by $2^M$. Repeating this gives a sequence which converges rapidly since the relative sizes of the non-leading coefficients are all small, of the order $2^{-M/2}$ or smaller.

It is to be appreciated that the particular correlation algorithm described above and the associated solution techniques are presented by way of illustrative example only. Other types of correlation algorithms may be used to generate measures of crosstalk in alternative embodiments of the invention.

A particular advantage of the DSL system in the illustrative embodiment is that it can measure crosstalk even between DSL lines which are not synchronized with one another at a symbol level or a sample level. This allows DSM level 2 algorithms to be used in conjunction with precoding, resulting in enhancements to performance beyond those obtained from precoding alone. For example, decisions made on the basis of the crosstalk measurements may include deciding which lines to precode as well as which tones to use in preceding.

Although described in the context of downstream DSL channels in FIG. 3, the disclosed techniques can be readily adapted to upstream channels.

A number of other exemplary communication systems implementing crosstalk measurement in accordance with embodiments of the invention will now be described with reference to FIGS. 4 and 5. Transmitters and receivers of these systems, and of other systems described herein, may be implemented using elements such as processors 110, memories 112 and interfaces 114 as shown in FIG. 1. As indicated previously, conventional aspects of such elements are well known.

Figure 4:
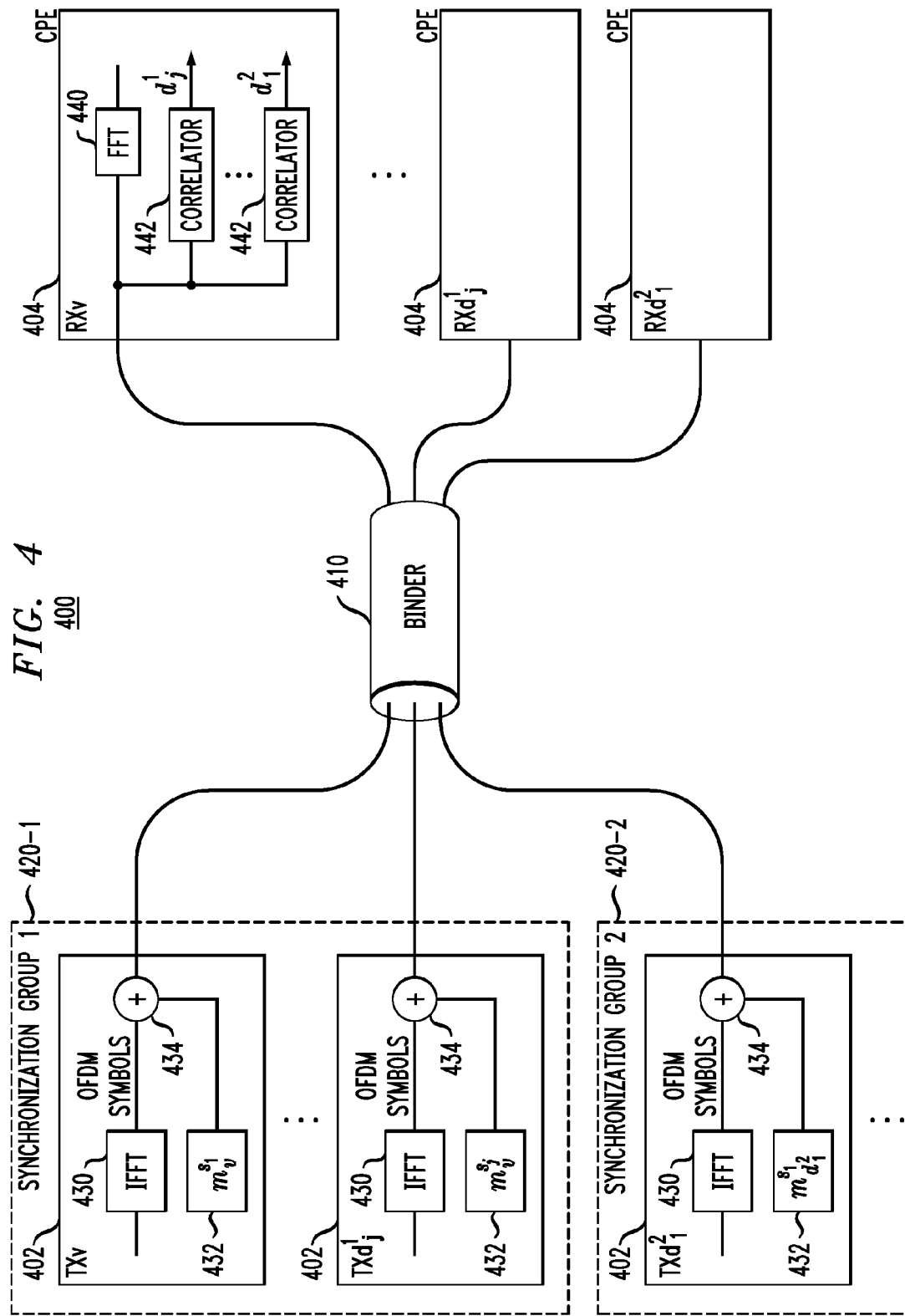

FIG. 4 shows an example of a DSL system 400 comprising multiple transmitters 402 that communicate with respective ones of multiple receivers 404. The transmitters 402 may be associated with one or more central offices of the system, and each of the receivers 404 may comprise CPE, such as modems, computers or other communication devices. Communication channels in this embodiment comprise subscriber lines between the transmitters 402 and respective ones of the receivers 404. These subscriber lines share a common binder 410. The transmitters 402 are shown as being arranged into first and second synchronization groups 420-1 and 420-2, as indicated by the dashed lines in the figure. A given subscriber line and receiver 404 may also be viewed as being part of the same synchronization group as their corresponding transmitter.

In this example, the transmitters 402 and receivers 404 are more particularly identified in the figure by their synchronization groups, as well as their status as victim or disturber in the particular crosstalk measurements being made.

The transmitter TXv and receiver RXv are associated with the victim subscriber line for which crosstalk is being measured. The disturber transmitters and receivers shown in the figure include the pairs $TXd^1_j$, $RXd^1_j$ and $TXd^2_1$, $RXd^2_1$. In this notation, the superscript denotes the synchronization group, and the subscript denotes the particular subscriber line within that group.

Each of the transmitters 402 as shown in the figure comprises a number of signal processing elements including an inverse Fast Fourier Transform (IFFT) element 430, an M-sequence generator 432 and a signal combiner 434. A particular M-sequence output by a given M-sequence generator 432 is combined in signal combiner 434 with OFDM symbols generated by the IFFT 430. For example, the M-sequence may be added at the digital sample level, on a sample-by-sample basis, with samples of the OFDM symbols. This may occur after attachment of any cyclic prefix and cyclic suffix. Other types of signal combination techniques may be used. The resulting combined signal is subject to conventional processing operations such as digital-to-analog conversion and modulation before being transmitted over the channel. Thus, within a given transmitter a corresponding M-sequence is combined with a data signal comprising the OFDM symbols subsequent to the IFFT 430 and prior to digital-to-analog conversion. Combining the M-sequence with the OFDM data signal in the time domain allows us to measure the crosstalk impulse response for unsynchronized lines.

The M-sequences need only be allocated a relatively small percentage of the overall signal power. Also, by increasing the length of the M-sequences the power allocated to those sequences can be reduced. The ratio of the M-sequence power to the data signal power may be made adjustable, so as to allow spectral requirements to be more easily met. It is expected that the signal-to-noise ratio of the resulting DSL signal in a typical implementation will be only marginally reduced, again depending on the amount of power allocated to the M-sequences in that implementation.

Long-term aggregate correlation may be performed over multiple vectors of N samples in order to obtain a more pronounced correlation result with limited M-sequence power. Such an approach may be particularly appropriate in the DSL context, where the characteristics of the subscriber lines typically change slowly. The use of aggregate correlation would allow the power of the M-sequences to be very low, thereby limiting the impact on signal-to-noise ratio and facilitating implementation of continuous monitoring applications. This type of long-term aggregate correlation is considered to be encompassed within the general term "correlation" as used herein.

It should be noted that, within a given synchronization group, the OFDM symbols are sent out synchronously by the transmitters of that group over the respective subscriber lines. This synchronization may be at a symbol level or at a sample level. Lines from different synchronization groups cannot be assumed to be in synchronization. Thus, at least two of the subscriber lines are not synchronized with one another at either a symbol level or a sample level. As indicated previously, it is a particular advantage of the illustrative embodiments that such embodiments permit measurement of crosstalk between subscriber lines or other channels that are not synchronized with one another.

The particular M-sequence utilized by a given transmitter in the system 400 is shown in the corresponding generator 432. Each of the transmitters in a given synchronization group utilizes a common M-sequence, but with a different cyclic shift. Thus, for example, transmitter TXv uses an M-sequence identified as $m_v$ with a shift of $s_1$ while transmitter $TXd^1_j$ also uses the M-sequence $m_v$ but with a shift of $s_j$. The transmitter $TXd^2_1$ uses a different M-sequence, namely one identified as $m_{d_1^2}$, with a shift of $s_1$. The M-sequences utilized by the transmitters 402 are thus identified in the figure with a subscript to show the common M-sequence used by the particular synchronization group. A bracketed superscript is used in the figure to denote the shift of a particular M-sequence.

The receiver RXv associated with the victim subscriber line measures the crosstalk by correlating its received signal with the M-sequences transmitted over the disturber subscriber lines. As this correlation occurs in the time domain it may be viewed as measuring the impulse response of the crosstalk at various lags. The receiver RXv includes a Fast Fourier Transform (FFT) element 440 and a number of correlators 442 each associated with one of the disturbing subscriber lines. Correlation is in the time domain prior to the FFT. Each of the correlators is run with different shifts to determine the impulse response at the various lags. Alternatively we can use several correlators in parallel to do this. Any such correlator arrangements can be implemented, for example, using processing circuitry such as processor 110R in receiver 104 of FIG. 1.

The particular M-sequences of the disturber lines may be retrieved from a memory of the receiver RXv. Such a memory may store the M-sequences associated with each of the channels of the system, so as to allow the receiver RXv to perform correlation relative to any potential disturber line. Similar arrangements may be used in each of the other receivers of the system 400.

Figure 5:
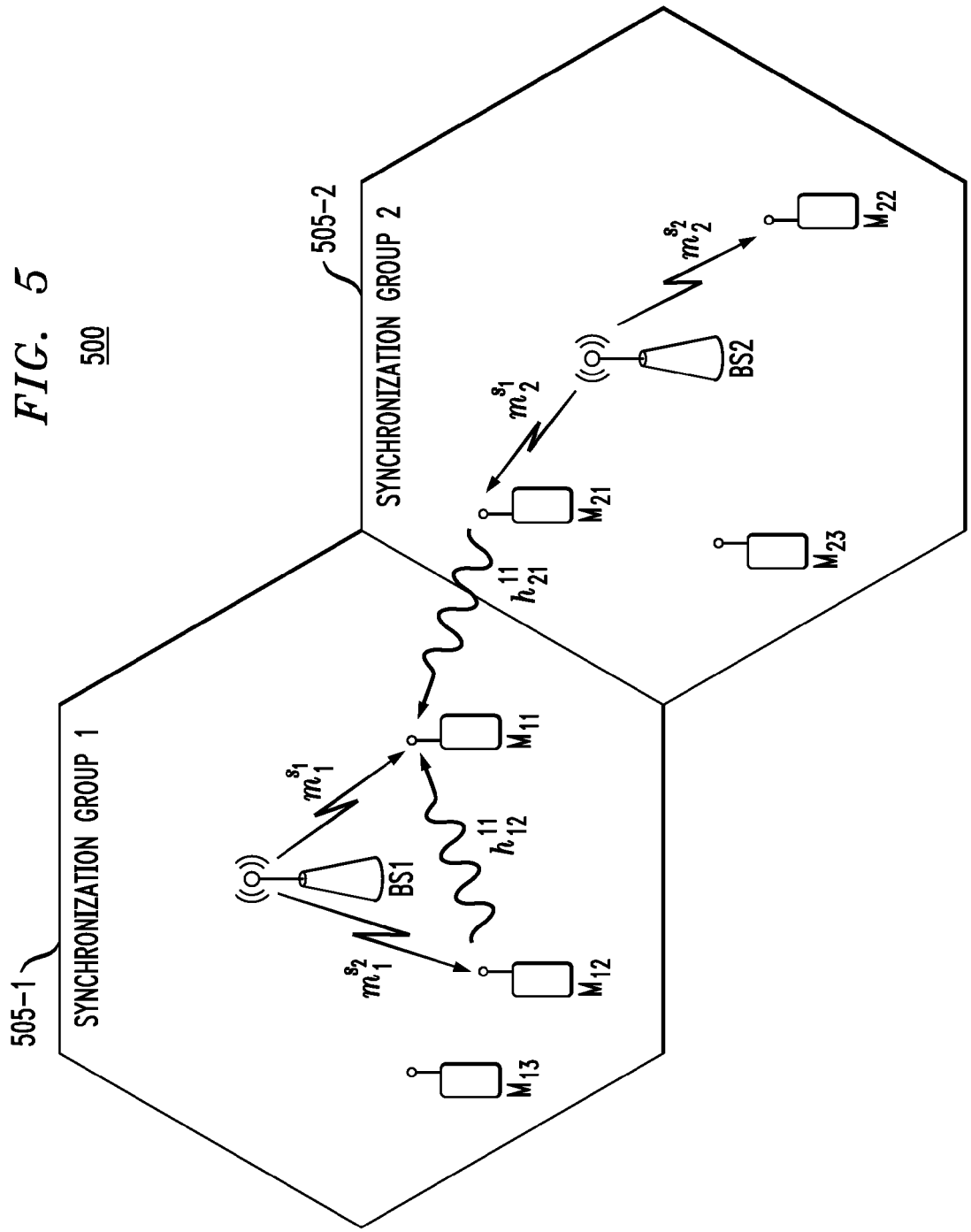

Referring now to FIG. 5, an example of a cellular system 500 in an illustrative embodiment of the invention is shown. The system 500 comprises a plurality of cells including cells 505-1 and 505-2, each having an associated base station. The base stations in cells 505-1 and 505-2 are denoted BS1 and BS2, respectively. Each of the cells 505-1 and 505-2 in this embodiment is shown as including three mobile units, which may be telephones, computers, wireless email devices, PDAs or other communication devices, in any combination. Of course, a typical cellular system will generally include a much larger number of cells, base stations and mobile units.

Downlink signals comprising M-sequences are shown as being transmitted to the mobile units from their respective base stations. The mobile units in cell 505-1 containing base station BS1 are assumed to be in a first synchronization group, while the mobile units in cell 505-2 containing base station BS2 are assumed to be in a second synchronization group. Thus, signals transmitted within a given cell are assumed to be synchronized with one another, but signals from different cells are not synchronized with one another.

It should be noted that in a cellular system such as that of FIG. 5, or other type of wireless system, the channels typically change much more rapidly than in a wired system. This means that precoding constructions may have to be done using far fewer measurements than in the DSL context. Nonetheless, the same principles apply and crosstalk measures such as correlation outputs generated by mobile units may be supplied to the base stations via appropriate feedback channels.

The three mobile units to which the downlink signals from base station BS1 are directed are designated as $M_{11}$, $M_{12}$ and $M_{13}$. Similarly, the three mobile units to which the downlink signals from base station BS2 are directed are designated as $M_{21}$, $M_{22}$ and $M_{23}$. As in the previous embodiments, different shifts of a common M-sequence are used for the respective channels of a given synchronization group. Crosstalk impulse responses are denoted using an identifier of the victim in the superscript and the disturber in the subscript. For example, the crosstalk impulse response $h_{12}^{11}$ has mobile unit $M_{11}$ as victim and mobile unit $M_{12}$ as disturber, and the crosstalk impulse response $h_{21}^{11}$ has mobile unit $M_{11}$ as victim and mobile unit $M_{21}$ as disturber.

The cellular system 500 may utilize OFDM data signals, as in the system 400 of FIG. 4. The M-sequences can be combined with the respective OFDM signals in the manner shown in that figure, that is, subsequent to an IFFT operation.

Although not explicitly shown in FIG. 5, a given mobile unit representing a victim for which crosstalk is to be measured will comprise correlators of the type shown in FIG. 4, one for each of the disturbers. Thus, to estimate crosstalk from the disturbers $M_{12}$ and $M_{21}$, the victim $M_{11}$ will correlate its received signal with the M-sequences of the disturbers in the manner previously described, to produce estimates of the above-noted crosstalk impulse responses $h_{12}^{11}$ and $h_{21}^{11}$.

Advantageously, the illustrative embodiments provide particularly efficient and accurate techniques for generating measures of inter-channel crosstalk in a communication system. As indicated previously, such measures may be used in performing operations such as precoding and line stabilization in a communication system transmitter. The measures are also useful in other applications, such as postcompensation or other types of interference cancellation techniques that may be performed in a system receiver or associated processing device. In such techniques, crosstalk measures generated as described herein can be used to cancel interference from one or more channels of the system.

It should again be emphasized that the embodiments described above are presented by way of illustrative example only. Other embodiments may use different communication system configurations, transmitter and receiver configurations, communication channels, and sequences of auxiliary time-domain signals, depending on the needs of the particular communication application.

For example, although the illustrative embodiments utilize M-sequences, other sequences with good correlation properties may be used. As one illustration, it is possible to utilize random or pseudorandom sequences of time-domain signals in place of the unbiased sets of M-sequences used in one or more of the illustrative embodiments.

As another example, the auxiliary time-domain signals may be transmitted separately from data signals, rather than in combination with data signals as in one or more of the illustrative embodiments described above.

Also, a given victim channel received signal that is subject to a correlation process with one or more sequences of time-domain signals associated with respective disturber channels may have a number of different forms. For instance, such a received signal may include the sequence of time-domain signals associated with its corresponding channel, or that sequence may be cancelled or otherwise removed prior to correlation of the received signal with the sequences associated with the respective disturber channels.

It should also be noted that the particular assumptions made in the context of describing the illustrative embodiments should not be construed as requirements of the invention. The invention can be implemented in other embodiments in which these particular assumptions do not apply.

These and numerous other alternative embodiments within the scope of the appended claims will be readily apparent to those skilled in the art.

What is claimed is:

1. A method of measuring crosstalk between at least two communication channels of a communication system, the method comprising the steps of:
   receiving a signal over a given one of the communication channels;
   correlating the received signal with at least one sequence of time-domain signals associated with another of the communication channels; and
   generating a measure of crosstalk between the given one of the communication channels and said another of the communication channels based on the correlation between the received signal and said at least one sequence of time-domain signals associated with another of the communication channels.

2. The method of claim 1 wherein the sequence of time-domain signals comprises a sequence selected from an unbiased set of sequences of time-domain signals.

3. The method of claim 1 wherein the sequence of time-domain signals is selected from a designated set of M-sequences.

4. The method of claim 3 wherein the designated set of M-sequences comprises an unbiased set $$M=\{m_0, m_1, \ldots m_{N-1}\}$$

having $N=2^M-1$ elements, where M is a positive integer, M denotes a set of vectors, and each of $m_0, m_1, \ldots, m_{N-1}$ denotes an individual vector in the set of vectors, and wherein distinct elements of M satisfy the property $$|(m_j^{[s1]})^\dagger m_k^{[s2]}| = 2^{M/2} - 1$$

when $j \neq k$ and for arbitrary cyclic shifts $s_1$, $s_2$.

5. The method of claim 1 wherein at least two of the channels are not synchronized with one another at a symbol level or a sample level.

6. The method of claim 1 wherein the generated measure of crosstalk between the communication channels comprises an impulse response characterizing crosstalk received in the given one of the channels from the other one of the channels.

7. The method of claim 1 wherein the channels are separated into a plurality of synchronization groups each associated with a distinct element of a designated set of sequences of time-domain signals.

8. The method of claim 7 wherein the sequences of time-domain signals associated with the respective channels of a given one of the synchronization groups comprise respective cyclic shifts of the corresponding distinct element of the designated set of sequences.

9. An article of manufacture comprising a non-transitory processor-readable storage medium storing one or more software programs which when executed by a processor perform the steps of the method of claim 1.

10. An apparatus for measuring crosstalk between at least two communication channels of a communication system, the apparatus comprising:
   a receiver configured to receive a signal over a given one of the communication channels, to correlate the received signal with at least one sequence of time-domain signals associated with another of the communication channels, and to generate a measure of crosstalk between the given one of the communication channels and said another of the communication channels based on the correlation between the received signal and said at least one sequence of time-domain signals associated with said another of the communication channels.

11. A method of measuring crosstalk between at least two communication channels of a communication system, the method comprising the step of:
   transmitting sequences of time-domain signals over respective ones of the communication channels;
   wherein a receiver receiving a signal over a given one of the communication channels correlates the received signal with the sequence of time-domain signals associated with another one of the communication channels, and generates a measure of crosstalk between the given one of the communication channels and said another of the communication channels based on the correlation between the received signal and said sequence of time-domain signals associated with said another of the communication channels.

12. The method of claim 11 wherein the sequences of time-domain signals are transmitted in combination with respective data signals.

13. The method of claim 11 further comprising the step of combining a given one of the sequences with a corresponding data signal in a transmitter of the communication system subsequent to an inverse Fourier transformation of the corresponding data signal.

14. The method of claim 11 further comprising the step of combining a given one of the sequences with a corresponding data signal in a transmitter of the communication system prior to a digital-to-analog conversion of the resulting combined signal.

15. An article of manufacture comprising a non-transitory processor-readable storage medium storing one or more software programs which when executed by the processor perform the steps of the method of claim 11.

16. An apparatus for transmitting signals utilizable for measuring crosstalk between at least two communication channels of a communication system, the apparatus comprising:
   a transmitter configured to transmit sequences of time-domain signals over respective ones of the communication channels;
   wherein a receiver receiving a signal over a given one of the communication channels correlates the received signal with the sequence of time-domain signals associated with another one of the communication channels, and generates a measure of crosstalk between the given one of the communication channels and said another of the communication channels based on the correlation between the received signal and the said sequence of time-domain signals associated with said another of the communication channels.

17. The apparatus of claim 16 wherein the transmitter is configured to transmit the sequences of time-domain signals in combination with respective data signals.

18. The apparatus of claim 16 wherein the transmitter is configured to combine a given one of the sequences with a corresponding data signal subsequent to an inverse Fourier transformation of the corresponding data signal.

19. The apparatus of claim 16 wherein the transmitter is configured to combine a given one of the sequences with a corresponding data signal prior to a digital-to-analog conversion of the resulting combined signal.

20. A communication system, comprising:

a transmitter; and a receiver configured to communicate with the transmitter over at least one of a plurality of communication channels;

wherein the receiver is configured to receive a signal over a given one of the communication channels, to correlate the received signal with at least one sequence of time-domain signals associated with another of the communication channels, and to generate a measure of crosstalk between the given one of the communication channels and said another of the communication channels based on the correlation between the received signal and said at least one sequence of time-domain signals associated with said another of the communication channels.

* * * * *